US012554362B2

(12) United States Patent
Kim et al.

(10) Patent No.: US 12,554,362 B2
(45) Date of Patent: *Feb. 17, 2026

(54) DISPLAY APPARATUS THAT CHANGES TOUCH-PANEL DRIVING FREQUENCY WHEN IT MATCHES DISPLAY-PANEL DRIVING FREQUENCY AND CONTROL METHOD THEREOF

(71) Applicant: Samsung Display Co., Ltd., Yongin-Si (KR)

(72) Inventors: Minhong Kim, Yongin-si (KR); Jungmok Park, Yongin-si (KR); Seungrok Lee, Yongin-si (KR); Hyeonseo Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,413

(22) Filed: May 24, 2024

(65) Prior Publication Data

US 2025/0068283 A1    Feb. 27, 2025

(30) Foreign Application Priority Data

Aug. 22, 2023  (KR) .......................... 10-2023-0110133

(51) Int. Cl.
*G06F 3/041*    (2006.01)
(52) U.S. Cl.
CPC ................................ *G06F 3/04184* (2019.05)

(58) Field of Classification Search
CPC .................................................. G06F 3/04184
See application file for complete search history.

(56) References Cited

U.S. PATENT DOCUMENTS

| 9,766,730 | B2* | 9/2017 | Lee | .......................... G06F 3/041 |
| 11,567,593 | B2 | 1/2023 | Kim et al. | |
| 2014/0022185 | A1* | 1/2014 | Ribeiro | .................... G06F 3/017 345/173 |
| 2016/0077617 | A1* | 3/2016 | Lee | ...................... G06F 3/04184 345/173 |
| 2016/0147350 | A1 | 5/2016 | Kida et al. | |
| 2018/0004343 | A1* | 1/2018 | Shin | ...................... G06F 3/0412 |
| 2021/0342055 | A1 | 11/2021 | Hirai | |
| 2023/0127214 | A1* | 4/2023 | Liu | ...................... G06F 3/04166 345/173 |
| 2023/0316968 | A1 | 10/2023 | Kim et al. | |
| 2025/0077027 | A1* | 3/2025 | Ohn | ..................... G06F 3/04184 |

FOREIGN PATENT DOCUMENTS

KR    10-1595626 A    2/2016
KR    10-2020-0053700 A    5/2020

* cited by examiner

*Primary Examiner* — Afroza Chowdhury
(74) *Attorney, Agent, or Firm* — Innovation Counsel LLP

(57) ABSTRACT

A display apparatus is disclosed that includes a touch panel, a display panel, and a touch integrated circuit (IC) configured to determine whether a first frequency, which is a driving frequency of the display panel, matches a second frequency, which is a driving frequency of the touch panel, and change the second frequency to a third frequency that is different from the first frequency when the first frequency matches the second frequency.

17 Claims, 11 Drawing Sheets

DISPLAY APPARATUS THAT CHANGES TOUCH-PANEL DRIVING FREQUENCY WHEN IT MATCHES DISPLAY-PANEL DRIVING FREQUENCY AND CONTROL METHOD THEREOF

CROSS-REFERENCE TO RELATED APPLICATION

This application is based on and claims priority under 35 U.S.C. § 119 to Korean Patent Application No. 10-2023-0110133, filed on Aug. 22, 2023, in the Korean Intellectual Property Office, the disclosure of which is incorporated by reference herein in its entirety.

BACKGROUND

1. Field

The present disclosure relates to a display apparatus, and more particularly, to a display apparatus including a touch panel.

2. Description of the Related Art

A touch panel is a device for recognizing an input action or an event by a user. In general, when a touch panel is touched by a object such as a finger, a stylus pen, or the like, the touch panel may generate an electrical signal to detect the presence and position of the touch. In the case of a user touch, noise may occur in the electrical signal.

To reduce power consumption, a display apparatus that supports a low-power driving mode has been recently developed. Various control methods to drive a touch panel with low power are desired.

SUMMARY

Embodiments may provide a control method of a display apparatus that avoids generating noise caused by a user touch.

Additional aspects will be set forth in part in the description which follows and, in part, will be apparent from the description, or may be learned by practice of the presented embodiments of the disclosure.

According to one or more embodiments, a display apparatus may include a touch panel, a display panel, and a touch integrated circuit (IC) configured to determine whether a first frequency, which is a driving frequency of the display panel, matches a second frequency, which is a driving frequency of the touch panel, and change the second frequency to a third frequency that is different from the first frequency when the first frequency matches the second frequency.

In an embodiment, the first frequency may be determined based on a display mode of the display panel.

In an embodiment, the display apparatus may further include a processor connected to the display panel and configured to recognize a change in information about the first frequency, and the touch IC may receive information about the first frequency from the processor.

In an embodiment, the display panel may be directly connected to the touch IC by an external pin, and the touch IC may be further configured to monitor a change in information about the first frequency.

In an embodiment, the touch IC may be further configured to determine whether a user touch signal includes harmonic noise based on whether the first frequency matches the second frequency.

In an embodiment, when it is determined that the user touch signal includes harmonic noise, the touch IC may change the second frequency to the third frequency by changing the second frequency to a hopping frequency selected from a plurality of predetermined hopping frequencies.

In an embodiment, the touch IC changes of the second frequency by changing an analog parameter stored in the touch IC.

In an embodiment, when it is determined that the user touch signal includes the harmonic noise, the touch IC may change the second frequency to the third frequency by dithering the second frequency to a predetermined frequency band.

In an embodiment, the touch IC changes of the second frequency by changing a digital bit stored in the touch IC.

In an embodiment, the predetermined frequency band may be within a range of and including 233 kHz to 264 kHz.

In an embodiment, the touch IC and the processor may be disposed on a printed board, the touch panel and the touch IC may be connected to each other by a plurality of sensing signal lines and a plurality of driving signal lines, the display panel and the processor may be connected to each other by a mobile industry processor interface (MIPI) transfer line, and the plurality of sensing signal lines and the plurality of driving signal lines may at least partially intersect the MIPI transfer line.

According to one or more embodiments, a method of controlling a display apparatus including a display panel and a touch panel includes receiving, by a touch integrated circuit (IC) connected to the touch panel, information about a first frequency, which is a driving frequency of the display panel, f determining, by the touch IC, whether the first frequency matches a second frequency, which is a driving frequency of the touch panel, and changing, by the touch IC, the second frequency to a third frequency that is different from the first frequency when the first frequency matches the second frequency.

In an embodiment, the receiving of the information about the first frequency may include receiving, by the touch IC, the information about the first frequency from a processor configured to recognize a change in the information about the first frequency, which is determined based on a mode of the display panel.

In an embodiment, the method may further include monitoring, by the touch IC that is directly connected to the display panel by an external pin, a change in the information about the first frequency.

In an embodiment, the determining of whether the first frequency matches the second frequency may include determining whether a user touch signal includes harmonic noise, based on whether the first frequency matches the second frequency.

In an embodiment, the changing of the second frequency to the third frequency may include changing the second frequency to the third frequency by changing the second frequency to a hopping frequency selected from a plurality of predetermined hopping frequencies when the user touch signal includes the harmonic noise.

In an embodiment, the changing of the second frequency to the third frequency may include changing the second frequency to the third frequency by changing an analog parameter stored in the touch IC.

In an embodiment, the changing of the second frequency to the third frequency may include an operation of changing the second frequency to the third frequency by dithering the second frequency to a predetermined frequency band when the user touch signal includes the harmonic noise.

In an embodiment, the changing of the second frequency to the third frequency may include changing the second frequency to the third frequency by changing a digital bit stored in the touch IC.

In an embodiment, the receiving of the information about the first frequency may include switching a first display mode of the display panel to a second display mode based on a user touch, and receiving, by the touch IC, information about the first frequency, which is determined based on the second display mode of the display panel.

In addition, a computer program stored in a computer-readable recording medium for execution to implement the disclosure may be further provided.

Also, a computer-readable recording medium having a computer program for executing a method to implement the disclosure stored thereon may be further provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
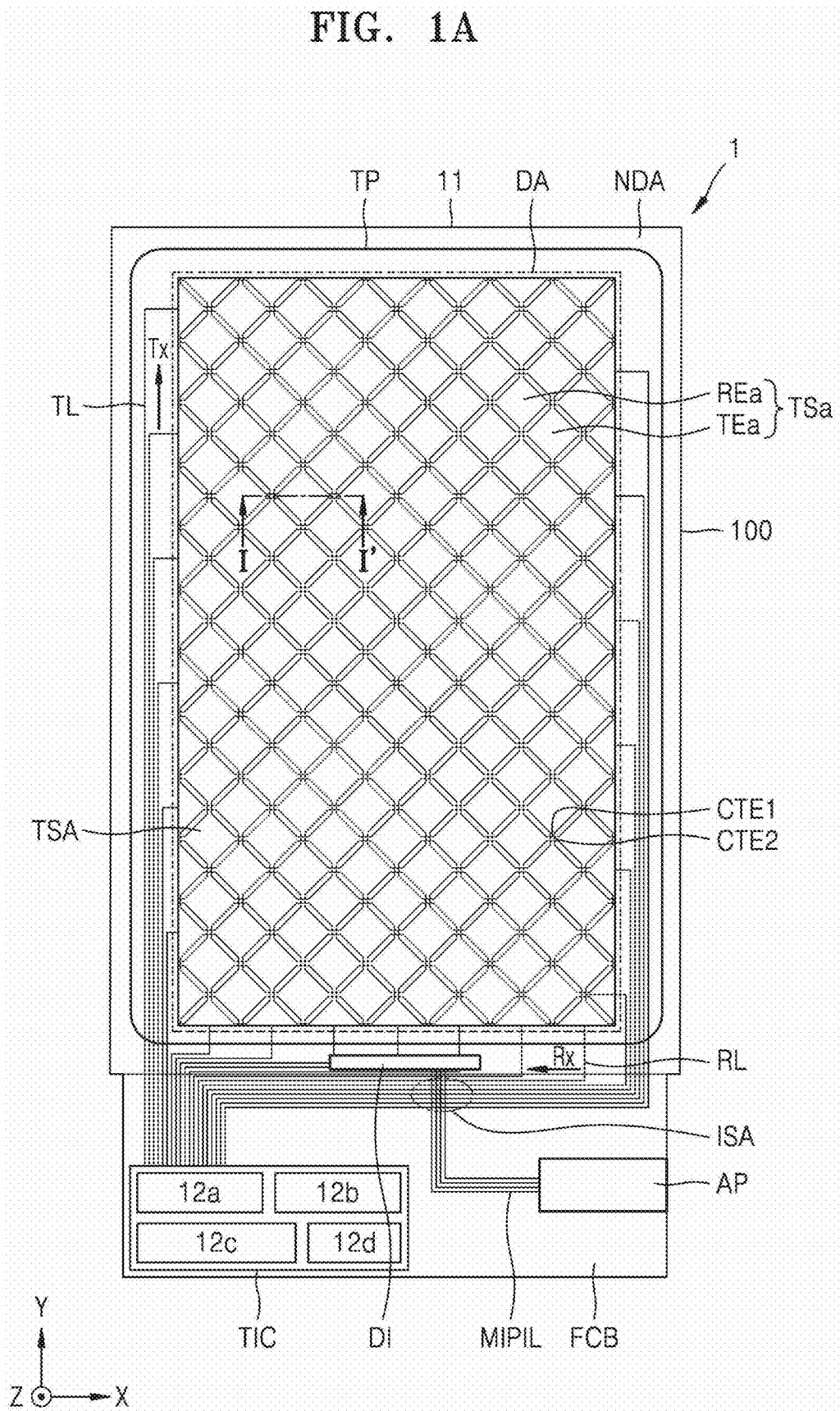
FIG. 1A is a plan view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B." Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. Effects and features of the disclosure and methods of achieving the same will be apparent with reference to embodiments and drawings described below in detail. The disclosure may, however, be embodied in many different forms and should not be construed as being limited to the embodiments set forth herein.

Throughout the disclosure, like reference numerals in the drawings denote like elements. The disclosure does not describe all elements of the embodiments, and general content or repeated content between embodiments in the technical field of the disclosure is omitted. The terms 'unit, module, member, block' used in the disclosure may be implemented in software or hardware, and according to embodiments, a plurality of 'units, modules, members, blocks' may be implemented as one component, or one 'unit, module, member, block' may include a plurality of components.

Throughout the disclosure, when a portion is 'connected to' another portion, it includes direction connection and indirect connection, and indirect connection includes connection through a wireless communication network.

Also, when a portion 'includes' any component, the portion may further include other components, rather than excluding the existence of the other components, unless otherwise described.

It will be understood that although the terms "first," "second," etc. may be used herein to describe various components, these components should not be limited by these terms. These components are only used to distinguish one component from another.

An expression used in the singular encompasses the expression of the plural, unless it has a clearly different meaning in the context.

The identification for each operation is used for convenience of explanation. The identification code does not explain the order of each operation, and each operation may be performed differently from the specified order unless a specific order is clearly stated in the context.

The disclosure will now be described more fully with reference to the accompanying drawings, in which embodiments of the disclosure are shown. Like reference numerals in the drawings denote like elements, and thus their description will not be repeated.

Figure 1B:
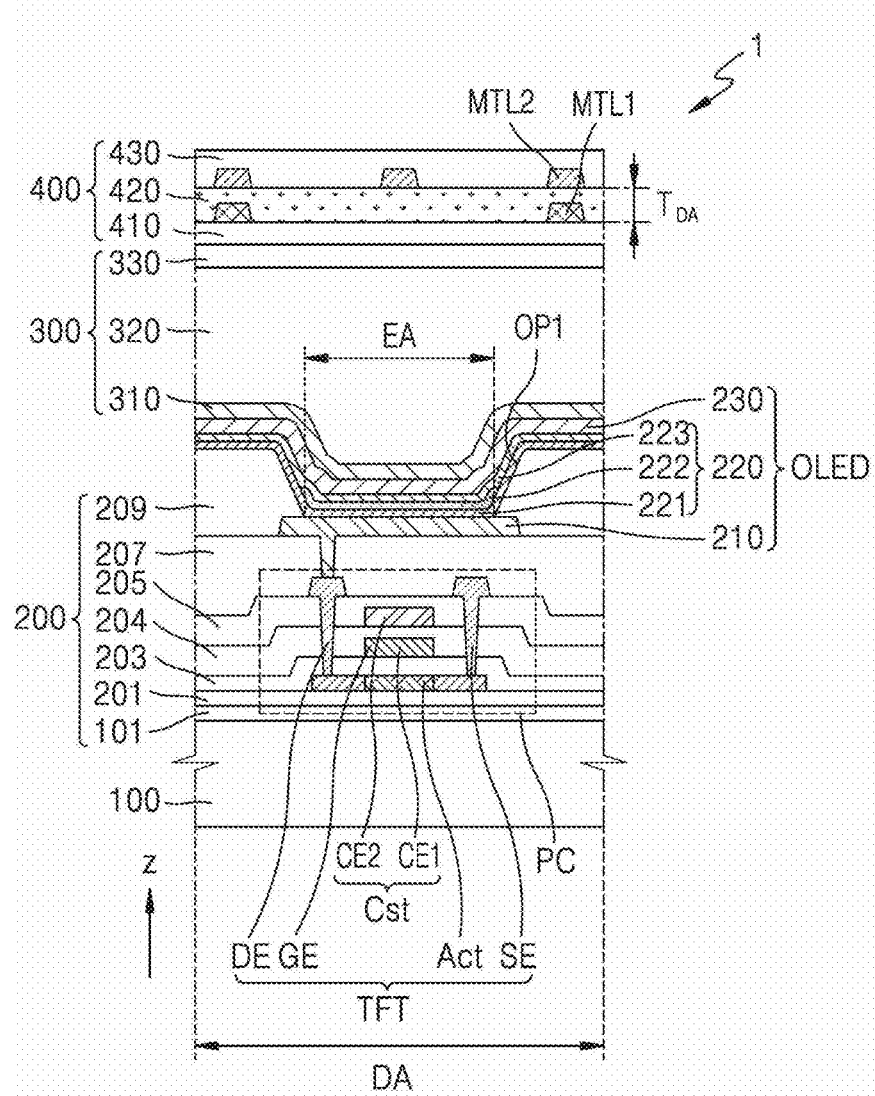
FIG. 1B is a schematic cross-sectional view of the display apparatus shown in FIG. 1A, taken along a line I-I'.
Figure 1C:
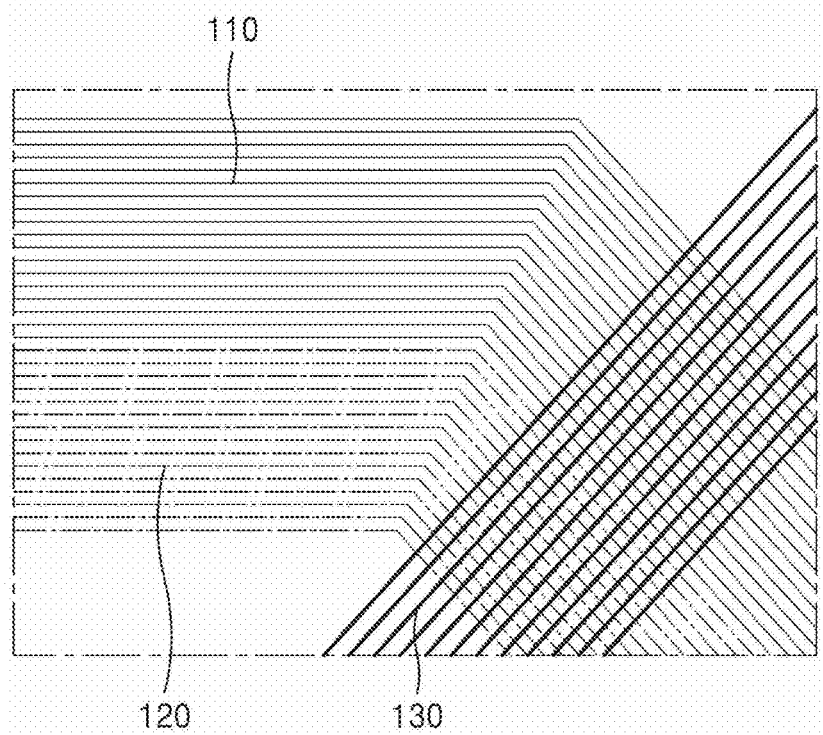
FIG. 1C is a diagram showing an intersection region of a plurality of lines in the display apparatus according to an embodiment.

FIG. 1A is a plan view of a display apparatus according to an embodiment, FIG. 1B is a schematic cross-sectional view of the display apparatus shown in FIG. 1A, taken along a line I-I', and FIG. 1C is a diagram showing an intersection region of a plurality of lines in the display apparatus according to an embodiment.

Referring to FIG. 1A, a display apparatus 1 may include a display panel 11, including a touch panel TP, and a printed board FCB. The display panel 11 may include a driver DI driving pixels. A touch integrated circuit (IC) TIC and a processor AP may be disposed on the printed board FCB.

Referring to FIG. 1A, the display apparatus 1 may be a portable electronic device, such as a mobile phone, a smartphone, a table personal computer (PC), a mobile communication terminal, an electronic notebook, an electronic book, a portable multimedia player (PMP), a navigation device, an Ultra Mobile PC (UMPC), or the like, and may also be used as a display screen of various products, such as a television, a laptop computer, a monitor, an advertisement board, an Internet of things (IoT) device, or the like. In addition, the display apparatus 1 according to an embodiment may be used as a wearable device, such as a smart watch, a watch phone, a glasses-type display, and a head-mounted display (HMD). In addition, the display apparatus 1 according to an embodiment may be used as a dashboard of a vehicle, a center fascia of a vehicle or a center information display (CID) disposed on a dashboard, a rear-view mirror display replacing a side mirror of a vehicle, and a display screen disposed on a back surface of a front seat as entertainment for a passenger in a back seat of a vehicle.

The display panel 11 may include a display area DA and a non-display area NDA.

Although not illustrated in the drawing, a plurality of pixels displaying images may be arranged in the display area DA. Each of the plurality of pixels may include a light-emitting element. The light-emitting element may be an organic light-emitting diode (OLED).

The non-display area NDA of the display panel 11 is arranged around the display area DA. The non-display area NDA may be a bezel area. The non-display area NDA may surround all sides of the display area DA, but is not limited thereto. The driver DI driving the display panel 11, the touch IC TIC, and the processor AP may be arranged in the non-display area NDA. In this case, the touch IC TIC and the processor AP may be disposed on the printed board FCB.

The display panel 11 may be driven by the driver DI to display an image. In an embodiment, the driver DI may be formed in the form of an IC chip to be directly disposed on a substrate of the display panel 11 by a chip-on-glass (COG) or chip-on-plastic (COP) method. In another embodiment, the driver DI may be disposed on the printed board FCB electrically connected to a terminal unit arranged on one side of a substrate 100 (refer to FIG. 1B) of the display panel 11. The printed board FCB may be a printed circuit board (PCB) or a flexible printed circuit board (FPCB).

The driver DI may drive the display panel 11 by transferring a signal to pixels of the display panel 11, based on input image data and control signals provided from the processor AP. In an embodiment, the driver DI may include a data driver that supplies data signals to pixels and a controller that outputs a control signal to the data driver. The controller may output a control signal to a gate driver (not shown) disposed on the substrate 100 of the display panel 11. The data driver may be arranged in the non-display area NDA and supply a gate signal to the pixels according to a driving frequency of the display panel 11. The data driver may supply a data signal to the pixels according to a driving frequency of the display panel 11.

The processor AP may be a graphics processing unit (GPU) or an application processor AP including the GPU, and in the disclosure, the processor AP may refer to an AP including a GPU. The processor AP may transfer input image data and control signals to the driver DI. According to an embodiment, when a display mode of the display panel 11 is changed, a first frequency, which is the driving frequency of the display panel 11, may be changed. The change of display mode of the display panel 11 may comprehensively refer to a case where a driving frequency is changed, such as a case where a display screen is switched, a case where a rear video shooting mode is switched to a front video shooting mode, a case where the resolution is changed, or the like. In an embodiment, the processor AP may change the first frequency according to a display mode and transfer, to the driver DI and the touch IC TIC, first frequency information according to the changed first frequency. In an embodiment, the first frequency information may be a vertical synchronization signal or a horizontal synchronization signal. A period of the vertical synchronization signal or the horizontal synchronization signal may vary according to the first frequency.

The touch IC TIC may be formed in the form of an IC chip to be disposed on the printed board FCB electrically connected to a terminal unit arranged on one side of a substrate of the display panel 11. The touch IC TIC may drive the touch panel TP to detect the touch or proximity of a conductive object.

The touch panel TP may include areas corresponding to the display area DA and the non-display area NDA of the display panel 11.

The touch panel TP may be a touch panel of a capacitance type that senses a change in capacitance caused by the touch of a conductive object (e.g., a finger, a stylus pen, or the like). Also, according to an embodiment, the touch panel TP may be an add-on type touch panel attached on the display panel 11, or may be an embedded type touch panel that is formed within the display panel 11. For example, the touch panel TP may be an on-cell type built-in touch panel or an in-cell type built-in touch panel, but is not limited thereto.

In the touch panel TP, an area corresponding to the display area DA of the display panel 11 may include a touch sensing area TSA. User touch sensing electrodes may be arranged in the touch sensing area TSA. For example, the user touch sensing electrodes may include a plurality of driving electrodes TEa and a plurality of sensing electrodes REa.

In an embodiment, the touch panel TP may be arranged only in a limited area required for touch recognition. In this case, the touch panel TP overlaps a portion of the display area DA but may not overlap another portion of the display area DA.

Referring to FIG. 1A, the touch sensing area TSA may be defined in the touch panel TP, the touch sensing area TSA may correspond to the display area DA of the display panel 11, and touch sensors TSa may be provided in the touch sensing area TSa. Also, the touch IC TIC controlling each touch sensor may be disposed on the printed board FCB.

A touch sensor TSa may include the plurality of driving electrodes TEa and the plurality of sensing electrodes REa, which are arranged in the touch sensing area TSA. The plurality of driving electrodes TEa may be arranged in a first direction (x direction) and spaced apart from each other in a second direction (y direction). Driving electrodes TEa adjacent to each other in the first direction may be connected to each other by a connection electrode to form a driving line. The plurality of sensing electrodes REa may be arranged in the second direction (y direction) and spaced apart from each other in the first direction (x direction). Sensing electrodes REa adjacent to each other in the second direction may be connected to each other by a connection electrode to form a sensing line. Driving lines and sensing lines may intersect each other. For example, sensing lines formed by the plurality of sensing electrodes REa may be arranged to intersect driving lines formed by the plurality of driving electrodes TEa in a plan view.

The plurality of driving electrodes TEa may be electrodes for applying a driving signal Tx to drive the touch panel TP by the touch IC TIC, each of the driving lines formed by connecting the plurality of driving electrodes TEa to each other may be connected to a driving signal line TL, so that the plurality of driving electrodes TEa may receive a driving signal Tx from the touch IC TIC.

The plurality of sensing electrodes REa are electrodes for the touch panel TP to sense a user touch signal, which may be electrodes for apply a sensing signal Rx to the touch IC TIC. Each of sensing lines formed by connecting the plurality of sensing electrodes REa to each other may be connected to a sensing signal line RL. When a user touch signal is sensed by the plurality of sensing electrodes REa, the sensing signal Rx may be transferred to the touch IC TIC through a plurality of sensing signal lines RL.

As shown in FIG. 1A, the plurality of sensing signal lines RL and a plurality of driving signal lines TL may be arranged in an area of the touch panel TP, the area corresponding to the non-display area NDA of the display panel 11. The plurality of driving signal lines TL may be signal lines for the touch IC TIC to apply an electrical signal to the plurality of sensing electrodes REa of the touch panel TP, and the plurality of sensing signal lines RL may be signal lines transferring electrical signals to the touch IC TIC from a sensing electrode disposed on the touch panel TP. The non-display area NDA may not include the touch sensing area TSA. In another embodiment, the non-display area NDA may also include a portion of the touch sensing area TSA. In FIG. 1A, the plurality of sensing signal lines and the plurality of driving signal lines are respectively shown as RL and TL, and the plurality of sensing signal lines and the plurality of driving signal lines are not limited to those shown in FIG. 1A and may further include lines necessary for transferring the sensing signal Rx and the driving signal Tx.

When there is a touch of a conductive object, the touch panel TP may transfer the sensing signal Rx to the touch IC TIC through the plurality of sensing signal lines RL, and the touch IC TIC may recognize whether a touch input has occurred and touch information such as a position of the touch by sensing a change in capacitance between the driving electrode TEa and the sensing electrode REa.

Referring to FIG. 1A, the touch IC TIC may include a signal driver 12a, a signal sensor 12b, and a memory 12c. The signal driver 12a may be electrically connected to the plurality of driving electrodes TEa on the touch panel TP through the plurality of driving signal lines TL to apply the driving signal Tx to the plurality of driving electrodes TEa according to a driving frequency of the touch panel TP. The signal driver 12a may receive a control signal according to the driving frequency of the touch panel TP from a control unit 12d and apply the driving signal Tx to the plurality of driving electrodes TEa according to the driving frequency of the touch panel TP, in response to the control signal. The signal sensor 12b may be electrically connected to the plurality of sensing electrodes REa on the touch panel TP through the plurality of sensing signal lines RL to receive the sensing signal Rx from the plurality of sensing electrodes REa and covert the received sensing signal Rx into a digital signal. A driving frequency of the touch panel TP may be determined based on a period or frequency of a vertical synchronization signal Vsync and a horizontal synchronization signal Hsync.

In an embodiment, the signal sensor 12b may include an analog front end receiving an analog signal and an analog-to-digital converter that converts a received analog signal into a digital signal. The memory 12c may store software, algorithm or the like for operating the touch IC TIC. The memory 12c may include random-access memory (RAM) or flash memory.

The control unit 12d may control an operation of the touch IC TIC. The control unit 12d may transfer a control signal to the signal driver 12a according to the driving frequency of the touch panel TP. It may determine whether a touch input presents and a touch position based on the sensing signals Rx received from the plurality of sensing electrodes REa on the touch panel TP. The control unit 12d may include a microcontroller unit (MCU) or a central processing unit (CPU).

In an embodiment, the control unit 12d may be provided as a single chip. For example, as shown in FIG. 1A, the touch IC TIC may be provided as a single chip including the control unit 12d. In another embodiment, the control unit 12d may made up of a single chip separate from the touch IC TIC.

The touch IC TIC may sense a change in mutual capacitance between the plurality of driving electrodes TEa and the plurality of sensing electrodes REa, a change in self-capacitance of the plurality of driving electrodes TEa, or a change in self-capacitance of the plurality of sensing electrodes REa. Because the plurality of driving electrodes TEa and the plurality of sensing electrodes REa are disposed on the entire surface of the touch sensing area TSA, the touch IC TIC may sense a change in mutual capacitance of the touch sensing area TSA or a change in self-capacitance of the touch sensing area TSA. The signal sensor 12b of the touch IC TIC may generate a sensing signal based on a change in mutual capacitance of the touch sensing area TSA or a change in self-capacitance of the touch sensing area TSA and transfer the generated sensing signal to the control unit 12d.

The control unit 12d may determine whether a touch input has occurred and a touch position based on the sensing signal, and may control an operation mode of the touch IC TIC.

The control unit 12d may receive first frequency information about the display panel 11 to recognize a first frequency, which is the driving frequency of the display panel 11. The control unit 12d may determine whether the first frequency matches a second frequency, which is the driving frequency of the touch panel TP, and may change the driving frequency of the touch panel TP to a third frequency that is different from the first frequency when the first frequency matches the second frequency. The control unit 12d may transfer a control signal to the signal driver 12a according to the changed driving frequency. The signal driver 12a may apply the driving signal Tx to the plurality of driving electrodes TEa according to the changed driving frequency of the touch panel TP.

Referring to FIG. 1B, a display element layer 200, an encapsulation layer 300, and a touch sensor layer 400 may be sequentially stacked in the display area DA of the substrate 100. An organic light-emitting diode OLED and a pixel circuit PC electrically connected to the organic light-emitting diode OLED may be disposed on the display element layer 200. The display panel 11 may include the display element layer 200 and the encapsulation layer 300, and the touch panel TP may include the touch sensor layer 400.

The substrate 100 may include an insulating material such as glass, quartz, a polymer resin, or the like. The substrate 100 may be a rigid substrate, or a flexible substrate which is bendable, foldable, rollable, or the like.

A buffer layer 201 may be disposed on the substrate 100 to reduce or block penetration of a foreign material, moisture, or external air from a lower portion of the substrate 100 and provide a flat surface on a semiconductor layer Act of the pixel circuit PC. The buffer layer 201 may include an inorganic material such as an oxide or a nitride, an organic material, or a composite of an organic material and an inorganic material, and may include a single-layered or multi-layered structure including an inorganic material and an organic material.

A barrier layer 101 blocking penetration of external air may be further included between the substrate 100 and the buffer layer 201. Each of the barrier layer 101 and the buffer layer 201 may include silicon oxide ($SiO_2$) or silicon nitride ($SiN_x$).

The pixel circuit PC including a thin-film transistor TFT and a storage capacitor Cst is disposed on the buffer layer 201. The thin-film transistor TFT may correspond to a first transistor TI to be described with reference to FIG. 4.

The thin-film transistor TFT may include the semiconductor layer Act, a gate electrode GE, a drain electrode DE, and a source electrode SE.

The semiconductor layer Act may be disposed on the buffer layer 201 and may include polysilicon. In another embodiment, the semiconductor layer Act may include amorphous silicon. In another embodiment, the semiconductor layer Act may include an oxide of at least one material selected from a group consisting of indium (In), gallium (Ga), stannum (Sn), zirconium (Zr), vanadium (V), hafnium (Hf), cadmium (Cd), germanium (Ge), chromium (Cr), titanium (Ti), and zinc (Zn). The semiconductor layer Act may include a channel area, a source area, and a drain area, wherein the source area and the drain area are doped with impurities. The source area and the drain area may be respectively arranged on both sides of the channel area.

A first gate insulating layer 203 may be provided to cover the semiconductor layer Act. The first gate insulating layer 203 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_2$), or the like. The first gate insulating layer 203 may include a single layer or a multi-layer, each including the above inorganic insulating material.

The gate electrode GE is disposed on the first gate insulating layer 203 to overlap the semiconductor layer Act. The gate electrode GE may include molybdenum (Mo), aluminum (Al), copper (Cu), Ti, or the like, and may include a single layer or a multi-layer. For example, the gate electrode GE may include a single layer of Mo.

A second gate insulating layer 204 may be provided to cover the gate electrode GE. The second gate insulating layer 204 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_2$), or the like. The second gate insulating layer 204 may include a single layer or a multi-layer, each including the above inorganic insulating material.

A second electrode CE2 of the storage capacitor Cst may be disposed on the second gate insulating layer 204. The second electrode CE2 may overlap the gate electrode GE. The gate electrode GE and the second electrode CE2 may overlap each other with the second gate insulating layer 204 therebetween to form the storage capacitor Cst. That is, the gate electrode GE may function as a first electrode CE1 of the storage capacitor Cst.

The second electrode CE2 may include Al, platinum (Pt), palladium (Pd), silver (Ag), magnesium (Mg), gold (Au), nickel (Ni), neodymium (Nd), iridium (Ir), chromium (Cr), calcium (Ca), Mo, Ti, tungsten (W), or Cu, and may be a single layer or a multi-layer, each including the material stated above.

An interlayer insulating layer 205 may be formed to cover the second electrode CE2. The interlayer insulating layer 205 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_2$), or the like. The interlayer insulating layer 205 may include a single layer or a multi-layer, each including the above inorganic insulating material.

The buffer layer 201, the first gate insulating layer 203, the second gate insulating layer 204, and the interlayer insulating layer 205 may be referred to as an inorganic insulating layer IIL.

The source electrode SE and the drain electrode DE are disposed on the interlayer insulating layer 205. Each of the source electrode SE and the drain electrode DE may include a conductive material including Mo, Al, Cu, Ti, or the like, and may include a multi-layer or a single layer, each including the above material. For example, each of the source electrode SE and the drain electrode DE may include a multi-layered structure of Ti/Al/Ti. In some embodiments, the source electrode SE or the drain electrode DE may be omitted. For example, thin-film transistors TFT, which are adjacent to each other, may share a source area or a drain area of the semiconductor layer Act, and the source area or the drain area may function as the source electrode SE or the drain electrode DE.

A planarization insulating layer 207 may be arranged to cover the source electrode SE and the drain electrode DE. The planarization insulating layer 207 may provide a flat base surface to a pixel electrode 210 disposed on an upper portion of the planarization insulating layer 207.

The planarization insulating layer 207 may include an organic material or an inorganic material, and may have a single-layered structure or a multi-layered structure. The planarization insulating layer 207 may include a general-purpose polymer, such as benzocyclobutene (BCB), polyimide, hexamethyldisiloxane (HMDSO), polymethyl methacrylate (PMMA), or polystyrene (PS), a polymer derivative containing a phenol group, an acrylic polymer, an imide polymer, an aryl ether polymer, an amide polymer, a fluorine polymer, a p-xylene polymer, or a vinyl alcohol polymer, or the like. The planarization insulating layer 207 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_2$), or the like. When the planarization insulating layer 207 is formed, chemical mechanical polishing may be performed on an upper surface of a layer to provide a flat upper surface after forming the layer.

The pixel electrode 210 may be disposed on the planarization insulating layer 207. The planarization insulating layer 207 may have a via hole exposing any one of the source electrode SE and the drain electrode DE of the thin-film transistor TFT, and the pixel electrode 210 may contact the source electrode SE or the drain electrode DE through the via hole to be electrically connected to the thin-film transistor TFT.

The pixel electrode 210 may include a conductive oxide, such as indium tin oxide (ITO), indium zinc oxide (IZO), zinc oxide (ZnO), indium oxide ($In_2O_3$), indium gallium oxide (IGO), or aluminum zinc oxide (AZO). The pixel electrode 210 may include a reflective film including Ag, Mg, Al, Pt, Pd, Au, Ni, Nd, Ir, Cr, or a compound thereof. For example, the pixel electrode 210 may have a structure having films including ITO, IZO, ZnO, or $In_2O_3$ above/below the above-stated reflective film. In this case, the pixel electrode 210 may have a stacked structure of ITO/Ag/ITO.

A pixel defining layer 209 may cover an edge of the pixel electrode 210 on the planarization insulating layer 207, and may have a pixel opening OP exposing a central portion of the pixel electrode 210. An emission area of the organic light-emitting diode OLED, that is, the size and shape of a pixel, is defined by the pixel opening OP.

The pixel defining layer 209 may prevent an arc or the like from being generated at an edge of the pixel electrode 210 by increasing a distance between the edge of the pixel electrode 210 and an opposite electrode 230 above the pixel electrode 210. The pixel defining layer 209 may be formed of an organic insulating material such as polyimide, polyamide, acrylic resin, BCB, HMDSO, and phenol resin in a spin coating method or the like.

The pixel defining layer 209 may be formed in black. The pixel defining layer 209 may include a light-blocking material and may be provided in black. The light-blocking material may include carbon black, carbon nanotubes, a resin or paste including a black dye, metal particles, such as Ni, Al, Mo, and alloys thereof, metal oxide particles (e.g., chromium oxide), metal nitride particles (e.g., chromium nitride), or the like. When the pixel defining layer 209 includes the light-blocking material, reflection of external light by metal structures disposed below the pixel defining layer 209 may be reduced.

An intermediate layer 220 may be arranged between the pixel electrode 210 and the opposite electrode 230. The intermediate layer 220 may include a first functional layer 221, an emission layer 222, and a second functional layer 223.

The emission layer 222 formed to correspond to the pixel electrode 210 is arranged inside the pixel opening OP of the pixel defining layer 209. The emission layer 222 may include a polymer material or a low-molecular-weight material, and may emit red, green, blue, or white light.

The first functional layer 221 and the second functional layer 223 may be respectively disposed below or on the emission layer 222. In an embodiment, unlike the emission layer 222 being patterned and arranged for each pixel, the first functional layer 221 and the second functional layer 223 may be integrally provided over an entire surface of the display area DA.

The first functional layer 221 may be a single layer or a multi-layer. For example, when the first functional layer 221 includes a polymer material, the first functional layer 221 may be a hole transport layer having a single-layered structure, and may include poly-(3,4)-ethylene-dihydroxy thiophene (PEDOT) or polyaniline (PANI). When the first functional layer 221 includes a low-molecular-weight material, the first functional layer 221 may include a hole injection layer and a hole transport layer.

The second functional layer 223 may be selectively arranged. For example, when each of the first functional layer 221 and the emission layer 222 includes a low-molecular-weight material, the second functional layer 223 may be preferably formed. The second functional layer 223 may be a single layer or a multi-layer. The second functional layer 223 may include an electron transport layer or an electron injection layer. In some embodiments, at least one of a hole injection layer, a hole transport layer, an electron transport layer, and an electron injection layer may be omitted.

The opposite electrode 230 may include a conductive material having a relatively low work function. For example, the opposite electrode 230 may include a (semi) transparent layer including Ag, Mg, Al, Ni, Cr, lithium (Li), calcium (Ca), alloys thereof, or the like. Alternatively, the opposite electrode 230 may further include a layer, such as ITO, IZO, ZnO, or $In_2O_3$, above the (semi) transparent layer including the materials stated above. In an embodiment, the opposite electrode 230 may include Ag and Mg.

A stacked structure of the pixel electrode 210, the intermediate layer 220, and the opposite electrode 230, which are sequentially stacked, may form the organic light-emitting diode OLED.

In an embodiment, a capping layer (not shown) may be disposed on the organic light-emitting diode OLED. The capping layer may improve the emission efficiency of the organic light-emitting diode OLED by a principle of constructive interference. The capping layer may be an organic capping layer including an organic material, an inorganic material including an inorganic material, or a composite capping layer including an organic material and an inorganic material.

The encapsulation layer 300 may be disposed on the organic light-emitting diode OLED. In an embodiment, the encapsulation layer 300 may include at least one inorganic encapsulation layer and at least one organic encapsulation layer. For example, the encapsulation layer 300 may include first and second inorganic encapsulation layers 310 and 330, and an organic encapsulation layer 320 arranged therebetween.

Each of the first and second inorganic encapsulation layers 310 and 330 may include one or more inorganic insulating materials. The inorganic insulating materials may include aluminum oxide ($Al_2O_3$), titanium oxide ($TiO_2$), tantalum oxide ($Ta_2O_5$), hafnium oxide ($HfO_2$), zinc oxide (ZnO), silicon oxide ($SiO_x$), silicon nitride ($SiN_x$), or/and silicon oxynitride (SiON). The first and second inorganic encapsulation layers 310 and 330 may be formed through chemical vapor deposition.

The organic encapsulation layer 320 may include polyethylene terephthalate, polyethylene naphthalate, polycarbonate, polyimide, polyethylene sulfonate, polyoxymethylene, polyarylate, HMDSO, an acrylic resin, or a combination thereof.

The encapsulation layer 300 may entirely cover the display area DA and extend toward the non-display area NDA to cover at least a portion of the non-display area NDA.

The encapsulation layer 300 may provide a flatter base surface by including the organic encapsulation layer 320, as described above. Accordingly, even when components of the touch sensor layer 400 are formed through a continuous process, the defect rate of touch sensing may be reduced.

Referring to FIG. 1B, the touch sensor layer 400 may have a multi-layered structure. The touch sensor layer 400 includes a sensing electrode (REa of FIG. 1A), a sensing signal line c (RL of FIG. 1A) connected to the sensing electrode, a driving electrode (TEa of FIG. 1A), a driving signal line (TL of FIG. 1A) connected to the driving electrode, and at least one insulating layer. A touch sensor included in the touch sensor layer 400 may sense an external input by using, for example, a capacitance method.

The touch sensor layer 400 may include a first touch insulating layer 410, a first touch conductive layer MTL1, a second touch insulating layer 420, a second touch conductive layer MTL2, and a third touch insulating layer 430.

The first touch insulating layer 410 may be directly positioned on the encapsulation layer 300. The first touch insulating layer 410 may include an inorganic material or an organic material and may be provided as a single layer or a multi-layer.

The first touch insulating layer 410 may function to prevent damage to the encapsulation layer 300 and block interference signals that may occur when the touch sensor layer 400 is driven.

For example, each of the first touch conductive layer MTL1 and the second touch conductive layer MTL2 may have a single-layered structure or a stacked multi-layered structure. A conductive layer of a single-layered structure may include a metal layer or a transparent conductive layer. The metal layer may include Mo, Ag, Ti, Cu, Al, and alloys thereof. The transparent conductive layer may include a transparent conductive oxide such as ITO, IZO, indium tin zinc oxide (ITZO), or the like. In addition, the transparent conductive layer may include a conductive polymer such as PEDOT, a metal nanowire, graphene, or the like.

A conductive layer of a multi-layered structure may include multiple metal layers. The multiple metal layers may have, for example, a three-layered structure of Ti/Al/Ti. The conductive layer of the multi-layered structure may include at least one metal layer and at least one transparent conductive layer.

In another embodiment, each of the first touch conductive layer MTL1 and the second touch conductive layer MTL2 may include a plurality of patterns. The first touch conductive layer MTL1 may include first conductive patterns, and the second touch conductive layer MTL2 may include second conductive patterns. The first conductive patterns and the second conductive patterns may form a touch sensor.

The first touch conductive layer MTL1 and the second touch conductive layer MTL2 may be electrically connected to each other through a contact hole. In an embodiment, the first touch conductive layer MTL1 and the second touch conductive layer MTL2 may each have a mesh structure to allow light emitted from the organic light-emitting diode OLED to pass therethrough. At this time, each of the first touch conductive layer MTL1 and the second touch conductive layer MTL2 may be arranged not to overlap an emission area EA.

The second touch insulating layer 420 may include an organic material. The organic material may include at least one material selected from a group consisting of an acrylic resin, a methacrylic resin, polyisoprene, a vinyl resin, an epoxy resin, a urethane resin, a cellulose resin, and a perylene resin. The second touch insulating layer 420 may further include an inorganic material. The inorganic material may include at least one material selected from a group consisting of silicon nitride ($SiN_x$), aluminum nitride (AlN), zirconium nitride (ZrN), titanium nitride (TiN), hafnium nitride (HfN), tantalum nitride (TaN), silicon oxide ($SiO_x$), and aluminum oxide ($Al_2O_3$), titanium oxide ($TiO_2$), tin oxide ($SnO_2$), cerium oxide ($CeO_2$), and silicon oxynitride (SiON).

The third touch insulating layer 430 may be disposed on the second touch conductive layer MTL2. The third touch insulating layer 430 may have a single-layered structure or a multi-layered structure. The third touch insulating layer 430 may include an organic material, an inorganic material, or a composite material.

FIG. 1B shows a case where the touch sensor layer 400 is directly formed on the encapsulation layer 300, and the display panel 11 (refer to FIG. 1A) includes the touch sensor layer 400, but the disclosure is not limited thereto. In another embodiment, the touch sensor layer 400 may be provided as a separate functional module from the display panel 11 and may be coupled to the display panel 11 through an optically clear adhesive or the like.

In an embodiment, referring to FIGS. 1A and 1B, the first touch conductive layer MTL1 may include second connection electrodes CTE2 connecting the plurality of sensing electrodes REa to each other. The second touch conductive layer MTL2 may include the plurality of sensing electrodes REa, the plurality of driving electrodes TEa, and first connection electrodes CTE1 connecting the plurality of driving electrodes TEa to each other. That is, the plurality of driving electrodes TEa may be connected to each other by the first connection electrodes CTE1 formed on the same layer, and the plurality of sensing electrodes REa may be connected to each other by the second connection electrodes CTE2 formed on different layers, the second connection electrodes CTE2 being connected to each other through a contact hole. In an embodiment, the plurality of driving electrodes TEa and the first connection electrodes CTE1 may be integrally formed.

Referring to FIG. 1A together, in a plan view, each of the first connection electrodes CTE1 and the second connection electrodes CTE2 may be arranged to intersect each other. Because an insulating layer (e.g., the second touch insulating layer 420) is arranged between a first connection electrode CTE1 and a second connection electrode CTE2, the first connection electrode CTE1 and the second connection electrode CTE2, which overlap each other, may form a kind of capacitor.

In another embodiment, a layer on which the plurality of driving electrodes TEa are disposed and a layer on which the plurality of sensing electrodes REa are disposed may be different layers.

Each of the plurality of driving electrodes TEa and the plurality of sensing electrodes REa may be arranged in a structure in which a plurality of continuous polygons in a diamond shape are connected to each other, but the disclosure is not limited thereto. The shape, size, or arrangement form of the plurality of driving electrodes TEa and the plurality of sensing electrodes REa may be variously changed according to the shape, size, or arrangement method of the display area DA.

Referring to FIG. 1A again, the driver DI and the processor AP may be connected to each other by a mobile industry processor interface (MIPI) transfer line MIPIL. The MIPI transfer line MIPIL may refer to a wired communication line that connects between the driver DI and the processor AP to transfer and receive input and output signals. In an embodiment, the driver DI may be disposed on the substrate 100, the processor AP may be disposed on the printed board FCB connected to the substrate 100, and the MIPI transfer line MIPIL connecting the driver DI and the processor AP to each other may be disposed on the substrate 100 and the printed board FCB.

According to an embodiment, a plurality of sensing signal lines RL, a plurality of driving signal lines TL, and the MIPI transfer line MIPIL may at least partially intersect each other on the substrate 100 and the printed board FCB. For example, referring to FIG. 1C, the plurality of sensing signal lines RL (i.e., 110), the plurality of driving signal lines TL (i.e., 120), and the MIPI transfer line (i.e., 130) may at least partially intersect each other on the printed board FCB.

Figure 2:
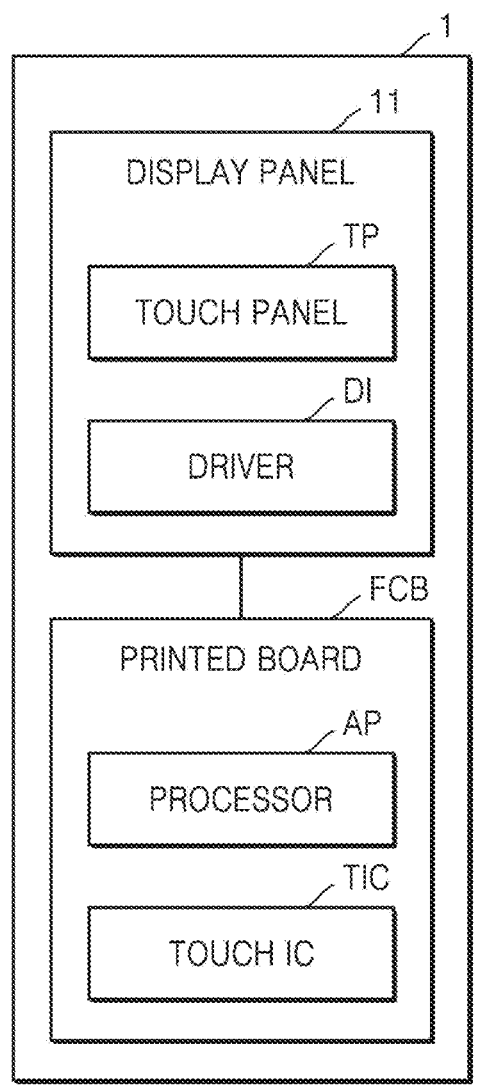
FIG. 2 is a block diagram of a display apparatus according to an embodiment.

FIG. 2 is a block diagram of a display apparatus according to an embodiment.

Referring to FIG. 2, the display apparatus 1 may include the display panel 11, the touch panel TP, and the printed board FCB. The display apparatus 1 of FIG. 2 may have the same configuration and operation as the display apparatus 1 of FIG. 1. The touch panel TP may be disposed on the display panel 11, and the printed board FCB may be electrically connected to a terminal unit arranged on one side of a substrate of the display panel 11.

A plurality of pixels may disposed on the display panel 11, and the plurality of pixels may display images according to a driving frequency of the display panel 11.

A plurality of touch sensors TSa may be disposed on the touch panel TP, and each of the plurality of touch sensors TSa may include the plurality of driving electrodes TEa and the plurality of sensing electrodes REa. The touch sensor TSa may sense a touch according to a driving frequency of the touch panel TP.

In an embodiment, the display apparatus 1 may include the display panel 11, the touch panel TP, and the driver DI, but is not limited thereto and may include different components.

In an embodiment, the processor AP and the touch IC TIC may be disposed on the printed board FCB, but the disclosure is not limited thereto, and different components may be further disposed on the printed board FCB.

The touch IC TIC may supply the driving signal Tx according to a second frequency to the plurality of driving electrodes TEa of the touch panel TP through the plurality of driving signal lines TL, and when there is a user touch, the sensing signal Rx sensed by the plurality of sensing electrodes REa of the touch panel TP may be transferred to the touch IC TIC on the printed board FCB through the plurality of sensing signal lines RL.

As described above, when a mode of the display panel 11 is changed, a driving frequency of the display panel 11 may be changed. The driving frequency of the display panel 11 may be a frame frequency fir driving the display panel 11 in response to the mode of the display panel 11, and a period or frequency of the vertical synchronization signal Vsync and the horizontal synchronization signal Hsync provided from the processor AP may be changed according to the frame frequency. The processor AP on the printed board FCB may transfer information of the changed driving frequency to the driver DI. In the disclosure, the driving frequency of the display panel 11 may be referred to as a first frequency, and driving frequency information may be referred to as first frequency information. An electrical signal transferred from the processor AP to the driver DI may be transferred through the MIPI transfer line MIPIL (refer to FIG. 1), and the first frequency information may be, for example, the vertical synchronization signal Vsync or the horizontal synchronization signal Hsync.

Figure 3:
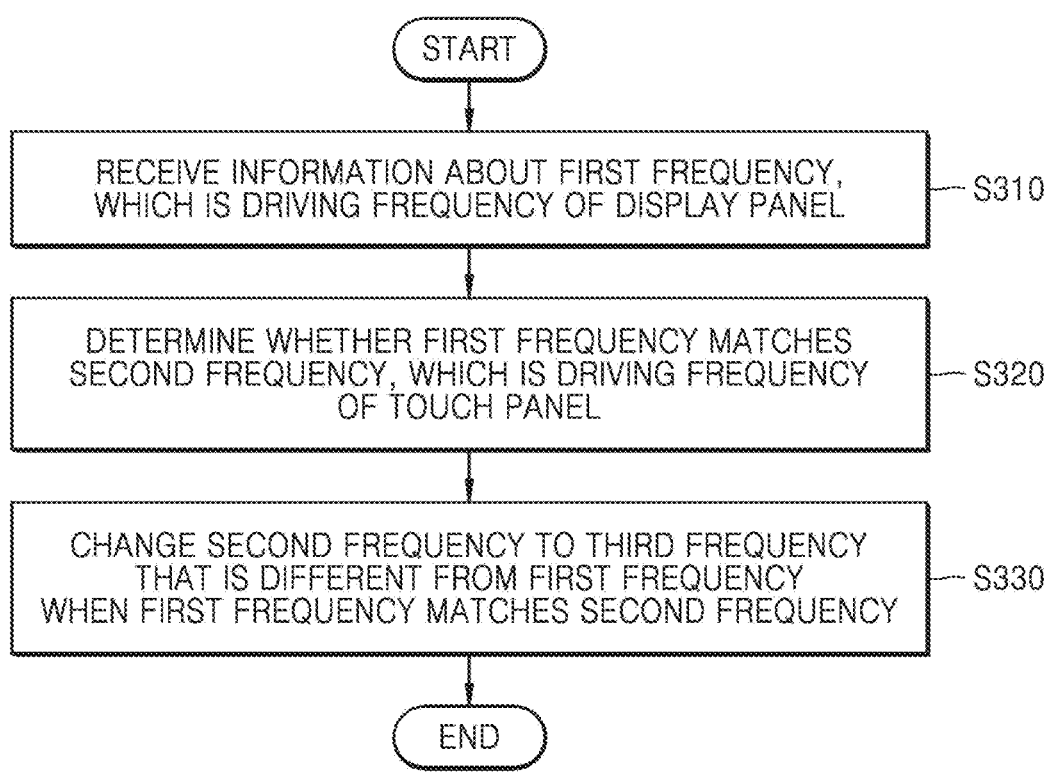
FIG. 3 is a flowchart diagram showing an operation in which a touch integrated circuit (IC) according to an embodiment changes a second frequency to a third frequency.

FIG. 3 is a flowchart diagram showing an operation in which the touch IC TIC according to an embodiment changes a second frequency to a third frequency.

Referring to FIG. 3, S310 may refer to an operation in which the touch IC TIC receives information about a first frequency, which is a driving frequency of the display panel 11.

In an embodiment, the first frequency may be determined based on a display mode. Because the driving frequency may vary based on the display mode, when the display mode is switched, the driving frequency driving the display panel 11 may also be changed.

In an embodiment, the first frequency may be determined as the display mode is changed based on a user input. The user input may be a user touch. That is, the display mode may be changed by a user touch, and when the display mode is changed, the first frequency may be changed. For example, when a display screen of the display panel 11 is switched by a user touch and the display mode is changed, the processor AP may change the first frequency corresponding to the changed display mode, and provision periods of the vertical synchronization signal Vsync and the horizontal synchronization signal Hsync to the driver DI may vary according to the changed first frequency. The processor AP may provide the vertical synchronization signal Vsync and the horizontal synchronization signal Hsync as first frequency information to the touch IC TIC according to the first frequency corresponding to the changed display mode. When the first frequency is changed, the touch IC TIC may receive information about the changed first frequency from the processor AP.

In an embodiment, the processor AP may transfer information about the first frequency to the driver DI to drive and control the display panel 11 and also transfer the information about the first frequency to the touch IC TIC. The processor AP may determine a change in first frequency in real time and transfer information about the changed first frequency to the driver DI and the touch IC TIC in real time when the first frequency is changed.

In another embodiment, the touch IC TIC may be directly connected to the display panel 11 by an external pin. As the touch IC TIC is directly connected to the display panel 11 by a pin, the touch IC TIC may directly monitor a change in information about the first frequency for driving the display panel 11 by the driver DI without going through the processor AP and may determine a change in first frequency in real time based on a display mode.

In the disclosure, a frequency at which the touch IC TIC applies a driving signal (Tx of FIG. 1) to a driving electrode (TEa of FIG. 1) to drive the touch panel TP may be referred to as a second frequency. In an embodiment, a sensing frequency, which is a frequency at which the sensing electrode REa on the touch panel TP receives the sensing signal Rx, may be equal to a driving frequency, which is a frequency at which the touch IC TIC applies the driving signal Tx to the driving electrode TEa to drive the touch panel TP.

S320 may refer to an operation in which the touch IC TIC determines whether the first frequency matches the second frequency.

When the touch IC TIC receives information about the first frequency, which is the driving frequency of the display panel 11, from the processor AP while driving the touch panel TP according to the second frequency, the touch IC TIC may determine whether the first frequency matches the second frequency by comparing the first frequency with the second frequency. When the first frequency matches the second frequency, as the second frequency, which is the driving frequency of the touch panel TP, becomes harmonic (high frequency), noise may occur in a user touch signal. In the disclosure, noise generated as the first frequency matches the second frequency may be referred to as harmonic noise. For example, in a case where the first frequency, which is the driving frequency of the display panel 11, is 260 kHz, and the second frequency, which is the driving frequency of the touch panel TP, is 240 kHz, as harmonic noise does not occur, a user touch operation may be normally performed. However, in a case where in the first frequency is 240 kHz and the second frequency is 240 kHz, as the second frequency becomes harmonic, harmonic noise may occur during a user touch operation.

S330 may refer to an operation in which the touch IC TIC changes the second frequency to a third frequency that is different from the first frequency when the first frequency matches the second frequency in S320.

When harmonic noise occurs during a user touch operation as the first frequency matches the second frequency, the touch IC TIC may change the second frequency to the third frequency that is different from the first frequency. In an embodiment, when the first frequency and the second frequency received by the touch IC TIC are 250 kHz, the touch IC TIC may change the second frequency to another frequency within a noise-free range rather than 240 KHz.

Figure 4:
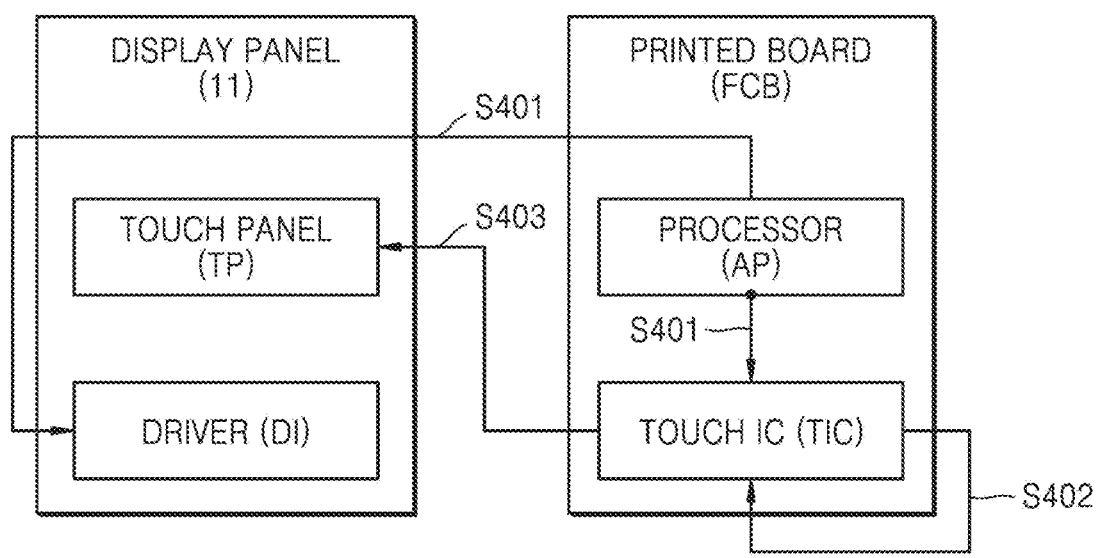
FIG. 4 is a block diagram of the flowchart diagram of FIG. 3, according to an embodiment.

FIG. 4 is a block diagram showing the flowchart diagram of FIG. 3, according to an embodiment.

In an embodiment, the processor AP may be electrically connected to the touch IC TIC disposed on the printed board FVB by an external pin and may be electrically connected to the driver DI through an MIPI transfer line.

In operation S401, the processor AP may transfer first frequency information determined based on a display mode to the driver DI and the touch IC TIC. As described above, switching of the display mode may comprehensively mean a case where the driving frequency of the display panel 11 is changed. In an embodiment, the processor AP may recognize a switch in display mode in real time, change the first frequency when the display mode is switched, and transfer first frequency information to the driver DI and the touch IC TIC in real time according to the changed first frequency. The driver DI and the touch IC TIC may determine the first frequency by analyzing the first frequency information. In an embodiment, the analyzing of the first frequency information may mean determining the period or frequency of the vertical synchronization signal Vsync or the horizontal synchronization signal Hsync.

When the touch IC TIC receives the first frequency information, the touch IC TIC may compare the first frequency with a second frequency, which is a driving frequency of the touch panel TP, to determine whether the first frequency matches the second frequency. When the first frequency matches the second frequency, the touch IC TIC may change the second frequency to a third frequency that is different from the first frequency in operation S402, and the touch IC TIC may drive the touch panel TP with the changed third frequency in operation S403.

When the first frequency matches the second frequency, harmonic noise may generally occur in a user touch signal during a user touch operation, but even when the first frequency matches the second frequency, harmonic noise may also not occur during a touch sensing operation. According to an embodiment, even when harmonic noise does not occur during a user touch operation, when the first frequency matches the second frequency, the touch IC TIC may change the second frequency to the third frequency that is different from the first frequency.

In another embodiment, when harmonic noise occurs during a user touch operation, even when the first frequency does not match the second frequency, the second frequency may be changed to a frequency in a noise-free range, that is different from the first frequency. The touch IC TIC may determine that harmonic noise has occurred when a jitter value at a particular frequency is greater than a predetermined value. As a signal has a higher jitter value, a signal waveform of a digital pulse is disturbed on a time axis, and thus the signal having a higher jitter value may represent an unstable signal.

Figure 5:
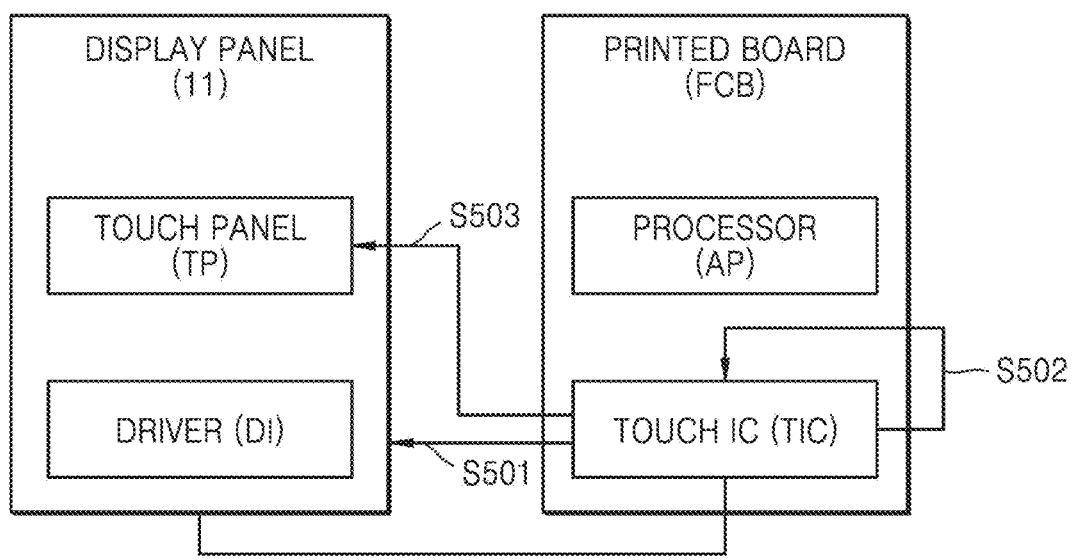
FIG. 5 is a block diagram showing a procedure of changing a second frequency to a third frequency when a display panel is directly connected to a touch IC, according to an embodiment.

FIG. 5 is a block diagram showing the procedure of changing a second frequency to a third frequency when the display panel 11 according to an embodiment is directly connected to the touch IC TIC, according to an embodiment.

In an embodiment, the touch IC TIC may be directly connected to the display panel 11 through a pin. In this case, as described above, in operation S501, the touch IC TIC may directly monitor information about a first frequency, which is a driving frequency of the display panel 11, without going through the processor AP, and may determine the first frequency by analyzing the information about the first frequency on its own for a certain period of time. That is, the touch IC TIC may directly monitor a change in first frequency by being directly connected to the display panel 11, and a control unit (12d of FIG. 1A) may determine a value of the first frequency by analyzing the information about the first frequency. The touch IC TIC may determine whether the first frequency matches a second frequency, which is a driving frequency of the touch panel TP. When the first frequency matches the second frequency, the touch IC TIC may change the second frequency to a third frequency that is different from the first frequency in operation S502. The touch IC TIC may drive the touch panel TP with the changed third frequency in operation S503. That is, the touch IC TIC may drive the touch panel TP by applying the driving signal Tx according to the third frequency to the driving electrode on the touch panel TP through the plurality of driving signal lines TL.

Figure 6:
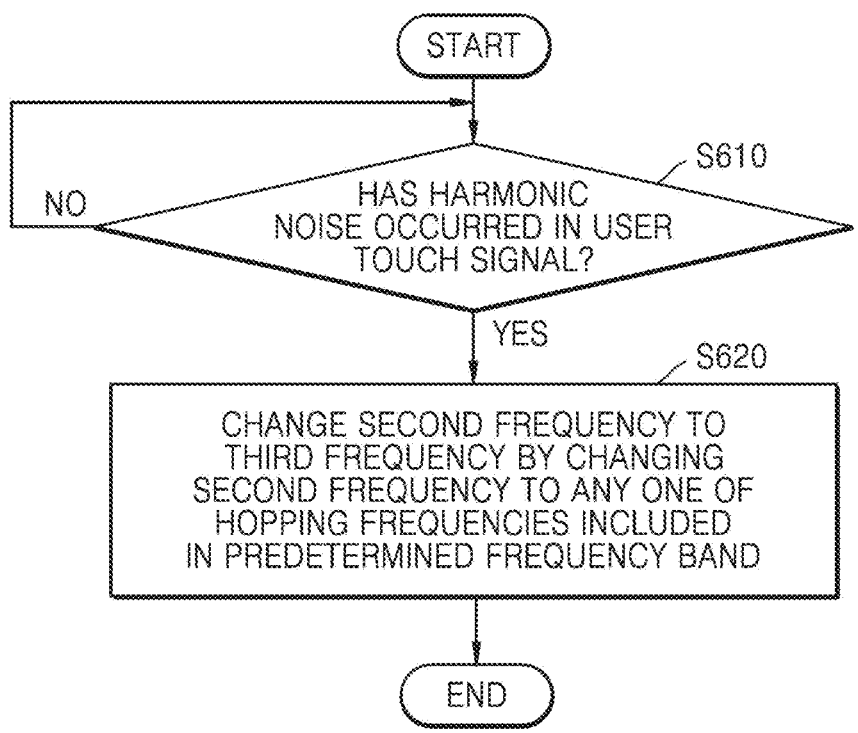
FIG. 6 is a flowchart diagram showing an operation of changing a second frequency to a third frequency when harmonic noise has occurred, according to an embodiment.
Figure 7:
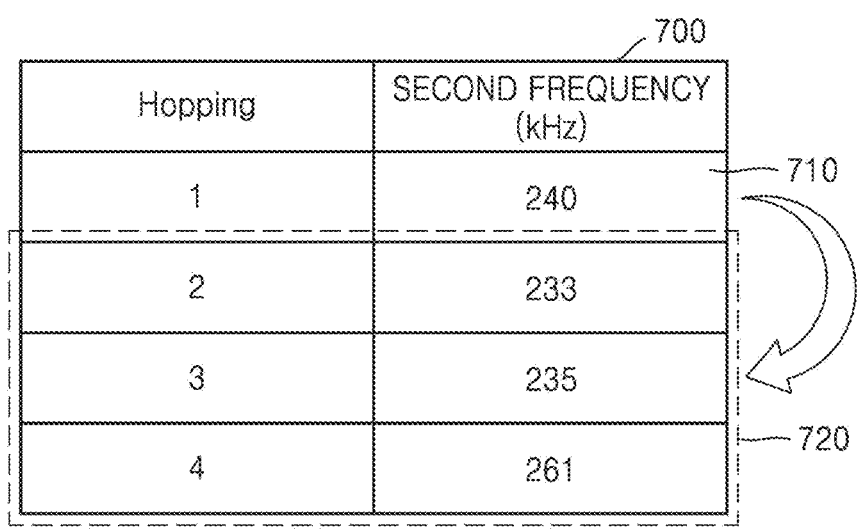
FIG. 7 is a diagram for explaining a change of a second frequency by a frequency hopping method according to an embodiment.

FIG. 6 is a flowchart diagram showing an operation of changing a second frequency to a third frequency when harmonic noise has occurred, according to an embodiment. FIG. 7 is a diagram for explaining a change of second frequency by a frequency hopping method according to an embodiment.

In an embodiment, operation S330 in which the touch IC TIC determines whether the first frequency matches the second frequency may include operation S610 of determining whether harmonic noise has occurred in a user touch signal.

When harmonic noise has occurred in a user touch signal, the touch IC TIC may change the second frequency to the third frequency that is different from the first frequency. In this case, in operation S620, the touch IC TIC may change the second frequency to the third frequency that is different from the first frequency by hopping to a predetermined frequency, which is stored in a memory. The third frequency may be any one of frequencies included in a noise-free range. The noise-free range may mean a range in which noise does not occur during a user touch operation. In an embodiment, the noise-free range may range from about 233 kHz to about 264 kHz. A method of changing the second frequency to the third frequency by hopping to a frequency stored in a memory (12c of FIG. 1A) may be performed by an operation in which the touch IC TIC changes an analog parameter value stored in the memory (12c of FIG. 1A). For example, referring to FIG. 7, when the first frequency and the second frequency received by the touch IC TIC are 240 kHz (710), the touch IC TIC may change the second frequency to the third frequency by hopping to any one frequency of 233 kHz, 235 kHz, and 261 kHz (720) as a frequency (700) in a noise-free range stored in a memory (12c of FIG. 1A). The frequencies of 233 kHz, 235 kHz, and 261 kHz may be referred to as predetermined hopping frequencies and a selected frequency among them may be referred to as a hopping frequency.

Even when harmonic noise does not occur in a user touch signal, the touch IC TIC may continuously monitor whether harmonic noise has occurred. As described above, the touch IC TIC may determine that harmonic noise has occurred when a jitter value at a particular frequency is greater than a predetermined value.

Figure 8:
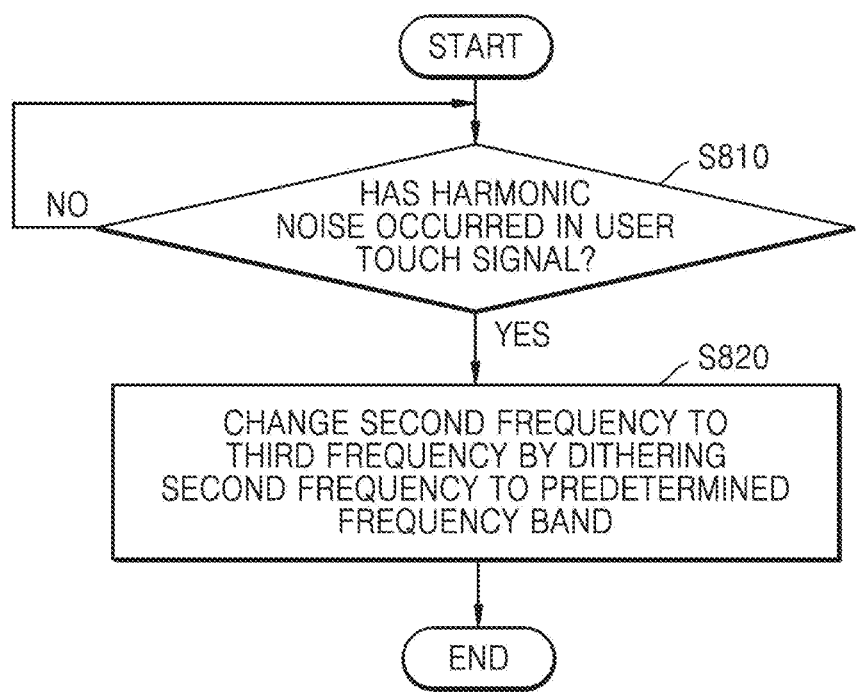
FIG. 8 is a flowchart diagram showing an operation of changing a second frequency to a third frequency when harmonic noise has occurred, according to an embodiment.
Figure 9:
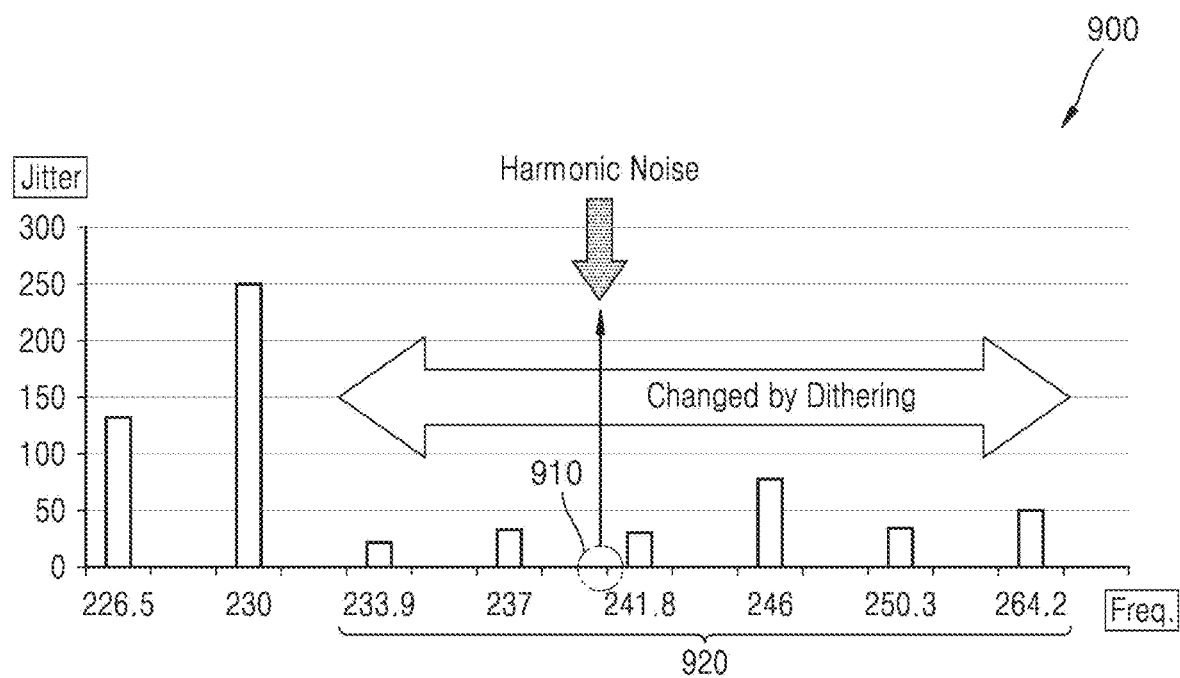
FIG. 9 is a diagram for explaining a change of a second frequency by a dithering method according to an embodiment.

FIG. 8 is a flowchart diagram showing an operation of changing a second frequency to a third frequency when harmonic noise has occurred, according to an embodiment. FIG. 9 is a diagram for explaining a change of second frequency by a dithering method according to an embodiment.

In an embodiment, operation S330 in which the touch IC TIC determines whether the first frequency matches the second frequency may include operation S810 of determining whether harmonic noise has occurred in a user touch signal.

When harmonic noise has occurred in a user touch signal, the touch IC TIC may change the second frequency to the third frequency that is different from the first frequency. In this case, in operation S820, the touch IC TIC may change the second frequency to the third frequency by dithering the second frequency to a predetermined frequency band. In this case, dithering may be a technique for removing generated noise by intentionally adding noise to a signal.

Through a method of changing a frequency in a dithering method, harmonic noise may be removed by intentionally adding dither noise to a user touch signal. The third frequency may be any one of frequencies included in a noise-free range, and the noise-free range may range from about 233 kHz to about 264 kHz. The method of changing the second frequency to the third frequency that is different from the first frequency by adding dither noise to a user touch signal may be performed by changing a digital bit embedded in a memory (12c of FIG. 1A) of the touch IC TIC. In this case, because there is no need to change an analog parameter stored in the touch IC TIC, the second frequency may be changed to the third frequency that is different from the first frequency with minimal operation. Through a change in frequency of a dithering method, the second frequency may be changed to the third frequency that is different from the first frequency, as a frequency that is close to the second frequency in a noise-free range.

Referring to FIG. 9, a jitter value according to a first frequency (kHz), which is received by the touch IC TIC from a processor, is shown in graph 900. In FIG. 9, as a signal has a higher jitter value, a signal waveform of a digital pulse is disturbed on a time axis, and thus the signal having a higher jitter value may represent an unstable signal. For example, in a case where the second frequency received by the touch IC TIC is 240 kHz, when the first frequency determined based on a mode of a display panel is 240 kHz (910), which is equal to the second frequency, harmonic noise may occur, and the touch IC TIC may change the second frequency to the third frequency close to 240 kHz in a noise-free range by changing a digital bit embedded in a memory (12c of FIG. 1A).

Operations of methods or algorithms described in connection with the embodiments may be directly implemented as hardware, a software module executed by hardware, or a combination thereof. The software module may reside on random-access memory (RAM), read-only memory (ROM), erasable programmable ROM (EPROM), electrically erasable programmable ROM (EEPROM), flash memory, hard disk, removable disk, compact disc (CD)-ROM, or any type of computer-readable recording medium well known in the art to which the disclosure belongs to.

According to an embodiment, a control method of a display apparatus to avoid noise generated by a user touch.

According to an embodiment, limitations of a structure that may not avoid physical interference may be overcome, and noise generated by a user touch may be avoided by a driving method of a display apparatus.

Effects of the disclosure are not limited to the effects mentioned above, and other effects not mentioned will be clearly understood by one of ordinary in the art from the following descriptions.

It should be understood that embodiments described herein should be considered in a descriptive sense only and not for purposes of limitation. Descriptions of features or aspects within each embodiment should typically be considered as available for other similar features or aspects in other embodiments. While embodiments have been described with reference to the figures, it will be understood by those of ordinary skill in the art that various changes in form and details may be made without departing from the spirit and scope as defined by the following claims.

What is claimed is:

1. A display apparatus comprising:
   a touch panel;
   a display panel; and
   a touch integrated circuit (IC) configured to determine whether a first frequency, which is a driving frequency of the display panel, matches a second frequency, which is a driving frequency of the touch panel, and change the second frequency to a third frequency that is different from the first frequency when the first frequency matches the second frequency,
   wherein the touch IC changes the second frequency by changing an analog parameter or a digital bit stored in the touch IC.

2. The display apparatus of claim 1, wherein the first frequency is determined based on a display mode of the display panel.

3. The display apparatus of claim 2, further comprising a processor connected to the display panel and configured to recognize a change in information about the first frequency, wherein the touch IC receives information about the first frequency from the processor.

4. The display apparatus of claim 2, wherein the display panel is directly connected to the touch IC and the touch IC is further configured to monitor a change in information about the first frequency.

5. The display apparatus of claim 3, wherein the touch IC is further configured to determine whether a user touch signal includes harmonic noise based on whether the first frequency matches the second frequency.

6. The display apparatus of claim 5, wherein, when it is determined that the user touch signal includes the harmonic noise,
   the touch IC changes the second frequency to the third frequency by changing the second frequency to a hopping frequency selected from a plurality of predetermined hopping frequencies by changing the analog parameter.

7. The display apparatus of claim 5, wherein, when it is determined that the user touch signal includes the harmonic noise, the touch IC changes the second frequency to the third frequency by dithering the second frequency to a predetermined frequency band by changing the digital bit.

8. The display apparatus of claim 7, wherein the predetermined frequency band is within a range of and including 233 kHz to 264 kHz.

9. The display apparatus of claim 3, wherein the touch IC and the processor are disposed on a printed board,
the touch panel and the touch IC are connected to each other by a plurality of sensing signal lines and a plurality of driving signal lines,
the display panel and the processor are connected to each other by a mobile industry processor interface (MIPI) transfer line, and
the plurality of sensing signal lines and the plurality of driving signal lines at least partially intersect the MIPI transfer line.

10. A method of controlling a display apparatus comprising a display panel and a touch panel, the method comprising:
receiving, by a touch integrated circuit (IC) connected to the touch panel, information about a first frequency, which is a driving frequency of the display panel;
determining, by the touch IC, whether the first frequency matches a second frequency, which is a driving frequency of the touch panel; and
changing, by the touch IC, the second frequency to a third frequency that is different from the first frequency when the first frequency matches the second frequency,
wherein the receiving of the information about the first frequency comprises switching a first display mode of the display panel to a second display mode; and
receiving, by the touch IC, information about the first frequency, which is determined based on the second display mode of the display panel.

11. The method of claim 10, wherein the receiving of the information about the first frequency comprises:
receiving, by the touch IC, the information about the first frequency from a processor configured to recognize a change in the information about the first frequency, which is determined based on a mode of the display panel.

12. The method of claim 10, further comprising monitoring, by the touch IC that is directly connected to the display panel by an external pin, a change in the information about the first frequency.

13. The method of claim 11, wherein the determining of whether the first frequency matches the second frequency comprises determining whether a user touch signal includes harmonic noise based on whether the first frequency matches the second frequency.

14. The method of claim 13, wherein the changing of the second frequency to the third frequency comprises changing the second frequency to the third frequency by changing the second frequency to a hopping frequency selected from a plurality of predetermined hopping frequencies when the user touch signal includes the harmonic noise.

15. The method of claim 14, wherein the changing of the second frequency to the third frequency comprises changing the second frequency to the third frequency by changing an analog parameter stored in the touch IC.

16. The method of claim 13, wherein the changing of the second frequency to the third frequency comprises changing the second frequency to the third frequency by dithering the second frequency to a predetermined frequency band when the user touch signal includes the harmonic noise.

17. The method of claim 16, wherein the changing of the second frequency to the third frequency comprises changing the second frequency to the third frequency by changing a digital bit stored in the touch IC.

* * * * *